United States Patent
Gharavi-Alkhansari et al.

(10) Patent No.: US 9,542,722 B2
(45) Date of Patent: Jan. 10, 2017

(54) AUTOMATIC SCALING OF OBJECTS BASED ON DEPTH MAP FOR IMAGE EDITING

(71) Applicant: SONY CORPORATION, Tokyo (JP)

(72) Inventors: Mohammad Gharavi-Alkhansari, San Jose, CA (US); Golnaz Abdollahian, San Francisco, CA (US); Alexander Berestov, San Jose, CA (US); Wei Ji, San Jose, CA (US); Hiroyuki Takeda, San Jose, CA (US); Daniel Usikov, Newark, CA (US)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 14/584,756

(22) Filed: Dec. 29, 2014

(65) Prior Publication Data

US 2016/0189342 A1 Jun. 30, 2016

(51) Int. Cl.
G09G 5/00 (2006.01)
G06T 3/40 (2006.01)
G06T 7/00 (2006.01)
H04N 5/232 (2006.01)
G06T 11/60 (2006.01)
G06K 9/52 (2006.01)
G06T 15/20 (2011.01)

(52) U.S. Cl.
CPC . G06T 3/40 (2013.01); G06K 9/52 (2013.01); G06T 7/0051 (2013.01); G06T 11/60 (2013.01); G06T 15/20 (2013.01); H04N 5/23229 (2013.01)

(58) Field of Classification Search
None
See application file for complete search history.

(56) References Cited

U.S. PATENT DOCUMENTS

| 7,302,372 B1 * | 11/2007 | Wu | G06Q 10/04 138/178 |
| 7,336,277 B1 * | 2/2008 | Clark | G06T 15/04 345/1.2 |
| 2002/0140703 A1 * | 10/2002 | Baker | G06T 15/04 345/582 |

(Continued)

FOREIGN PATENT DOCUMENTS

WO 2013/191689 A1 12/2013

OTHER PUBLICATIONS

European Patent Office (EPO), Extended European Search Report, EP Application No. 15197850.9, issued May 12, 2016, pp. 1-9, with claims searched, pp. 10-12, related to U.S. Appl. No. 14/584,756.

Primary Examiner — Ryan R Yang
(74) Attorney, Agent, or Firm — O'Banion & Ritchey LLP; John P. O'Banion

(57) ABSTRACT

Automatic scaling of image objects being moved or copied to a target object location is presented. An original image and its depth map are received within which the user selects an original object and a target location for the object to be moved or copied. A center of scaling is found and a base location selected at which depth value is to be obtained at the target location for use in scaling. Target object is then scaled in response to a ratio between original object depth and target object depth. An occlusion check is made, after which non-occluded pixels are pasted to the target location to complete the move/copy which is in proper proportion and accounts for surrounding structures.

20 Claims, 7 Drawing Sheets

(56) References Cited

U.S. PATENT DOCUMENTS

| | | | |
|---|---|---|---|
| 2003/0179218 A1 | 9/2003 | Martins et al. | |
| 2008/0222081 A1* | 9/2008 | van Lieshout | G09G 3/3208 |
| 2009/0245593 A1* | 10/2009 | Suzuki | G06K 9/6212 |
| | | | 382/115 |
| 2010/0091093 A1* | 4/2010 | Robinson | G09G 3/003 |
| | | | 348/47 |
| 2010/0149216 A1* | 6/2010 | Dutta | G06T 1/00 |
| | | | 345/660 |
| 2010/0271466 A1 | 10/2010 | Newton | |
| 2011/0018966 A1* | 1/2011 | Kitazato | H04N 13/004 |
| | | | 348/43 |
| 2011/0273594 A1* | 11/2011 | Zhao | G06T 3/0012 |
| | | | 348/240.2 |
| 2011/0304691 A1* | 12/2011 | Newton | H04N 13/0018 |
| | | | 348/43 |
| 2012/0013607 A1 | 1/2012 | Lee | |
| 2012/0099836 A1 | 4/2012 | Welsh et al. | |
| 2012/0127273 A1 | 5/2012 | Zhang et al. | |
| 2013/0278727 A1 | 10/2013 | Tamir et al. | |
| 2014/0300644 A1* | 10/2014 | Gillard | G06T 15/20 |
| | | | 345/660 |
| 2015/0254839 A1* | 9/2015 | Yoo | G06K 9/46 |
| | | | 382/128 |
| 2015/0332464 A1* | 11/2015 | O'Keefe | G06T 7/0038 |
| | | | 348/47 |

\* cited by examiner

AUTOMATIC SCALING OF OBJECTS BASED ON DEPTH MAP FOR IMAGE EDITING

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This present disclosure pertains generally to moving or copying objects from within an image to other portions of the same image or other images, and more particularly to an improved process for pasting objects whose size is scaled in response to a depth map.

2. Background Discussion

In editing images, it is often desirable to move an object within an image, or to copy/cut the object from one image and paste it onto another image. This process generally involves the following steps: (a) copying or cutting the object from its original position, (b) pasting the object to another position in the same image, or to a position in another image. However, in many cases the moved/copied image does not appear natural in the resultant image.

Accordingly, a need exists for object move/copy operations which provide more realistic results.

BRIEF SUMMARY

Image editing functions are in significant demand, especially in view of the ubiquitous nature of modern mobile phones with their increasingly sophisticated cameras. One such image editing function is that of moving or copying objects from an image to another location in the same image or another image. Toward making the resultant image more realistic, it is important to have the object shown in its proper size in relation to its surroundings. This technical disclosure describes a scaling process when pasting or embedding (moving/copying) of an object identified within an image.

Further aspects of the disclosed technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology will be more fully understood by reference to the following drawings which are for illustrative purposes only:

DETAILED DESCRIPTION

When embedding an object, certain aspects of the object need to be adjusted so that the final edited image looks natural. These adjustments include the scale of the object, and occlusion of any part of the object in its new position. In some situations, these adjustments can be performed automatically utilizing the disclosed method which makes use of depth information.

The present disclosure treats all of these adjustments simultaneously, thereby allowing for complete automation in an image application where the user intends to move an object within the current scene, or place the object into a different scene by a simple move of the object by a cursor, or finger on a touch screen, whereby they can see the results of these movements in real time or near real time.

It will be appreciated that a digital image captured of a scene typically comprises a large plurality of pixels. For each pixel, the digital camera obtains information about the color of the object at the point in the scene whose image is formed on that pixel.

In certain cases, for image pixels, in addition to the color information of the pixel, depth information (Z direction) is also available, or can be determined. It should be noted that the term "depth" here is considered to be the distance between the lens plane and the point in the scene whose color is captured by the pixel.

Figure 1:
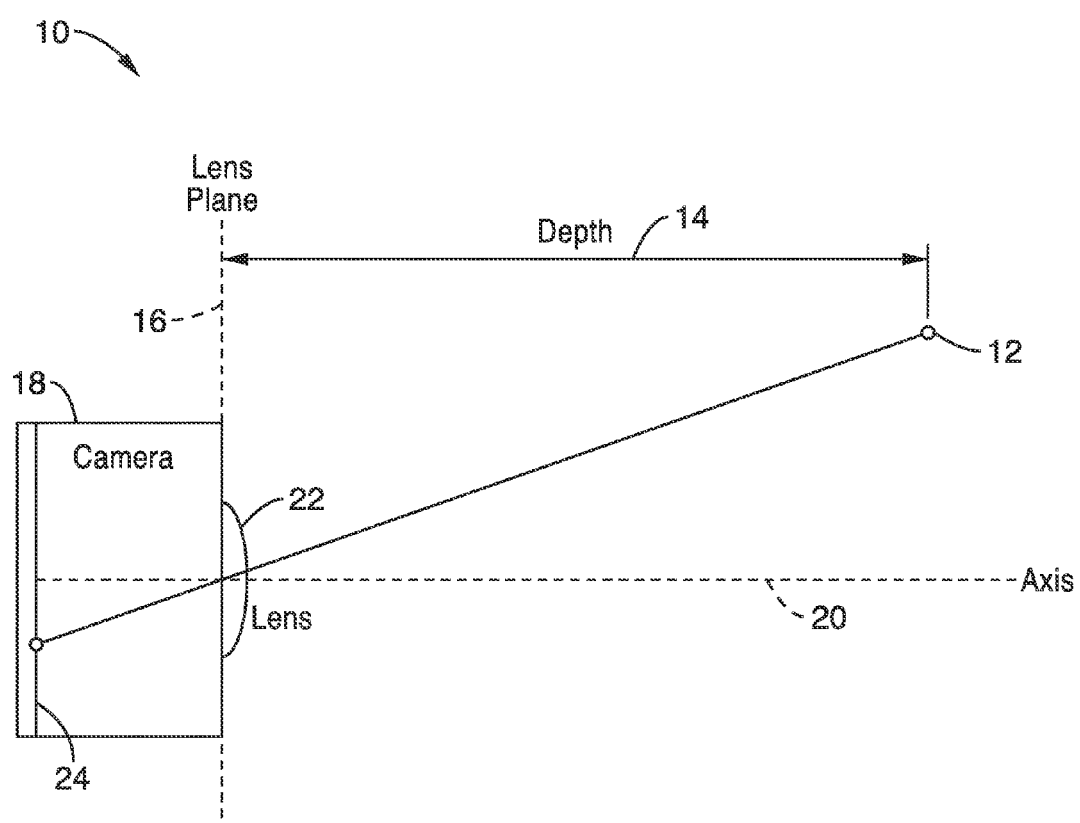
FIG. 1 is an image rendition of the meaning of depth value for a pixel in a captured image.

FIG. 1 illustrates an example embodiment 10 of image capturing parameters in which depth value 14 for an object point 12 is seen in relation to the lens plane 16 of an image capture device 18, having a lens 22 on a lens plane 16 which directs an object image onto an optical detector plane 24. It will be appreciated that lens plane 16 is the plane perpendicular to the lens axis 20, located at the lens position.

When pixel depth values are available for an image of a scene, the depth values of all the pixels form a map, called the depth map of the image. This depth map is utilized in this present disclosure as the basis for performing one or more automatic operations on the moved/copied object image.

At least one embodiment of the present disclosure operates in a target application in which the user identifies an object by touching a point 'O' somewhere inside the object on a touch screen displaying that image. The user then moves this point O to its final position O' as if a virtual handle has been attached to the object.

It is assumed that a depth map is available for the given image, and for the final target image if this is different from the original image (e.g., in an object copy operation). The position of the object in the image is specified by an object mask, which specifies each pixel belonging to this object of interest.

It will be noted that different areas of an image denote different depths. By way of example and not limitation, in an image of a room having a flat floor, objects contacting that floor at positions lower in the frame are closer to the camera. It should be recognized that images captured of objects farther away will appear smaller than that of the same object capture at a small depth. Thus, in moving an object from a first depth position to a different second depth position, it is preferable to scale the object size to correct for this imaging perspective. To perform this scaling, a scaling factor 's' is specified in which: s<1 specifies shrinking of the object, while s>1 specifies expansion of the object.

An important aspect of scaling is the center of scaling. The point toward which shrinking is done, or away from which expansion is done. In the target application, it is desirable for the center of scaling to be O'.

When moving an object to a new position, and scaling it according to its new depth value, one question which arises is: from where should the new depth value be obtained? The object, in its new position in the image, covers an image area, and each pixel in this image area can potentially have a different depth value. The question is, the depth of which point in this area should be used for scaling. Should the depth of the background image at point O' be used? Usually, the object, in its new position in the target image, after proper scaling, is expected to be standing on a surface, and the lowest point of the object after scaling is expected to be touching that surface. This means that the lowest point of the object after scaling and the same point in the target image should have the same depth value. This implies that the depth of the lowest point in image area where the object is put on, after scaling, should be used for obtaining the new depth for scaling. Therefore, O' is usually not a good point for getting the depth value for scaling, because, if the object is scaled according to the depth at position O', then the depth of the image at the bottom of the object may end up being different from that of the image, and the lowest point of the object may appear to have a depth different from that of the background image at the same point. This, for example, may give the appearance that the object is floating in space, or the appearance of the object having been scaled non-proportionately to its distance from the camera.

Figure 2A:
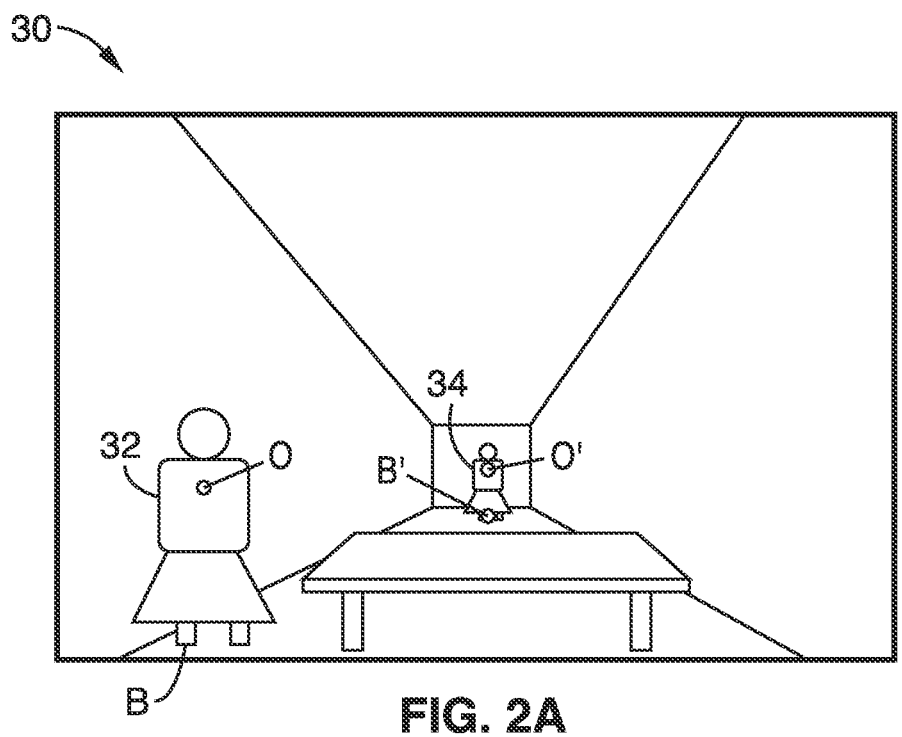
FIG. 2A and FIG. 2B are image renditions showing scaling issues which can arise when moving an object from one screen location to another.
Figure 2B:
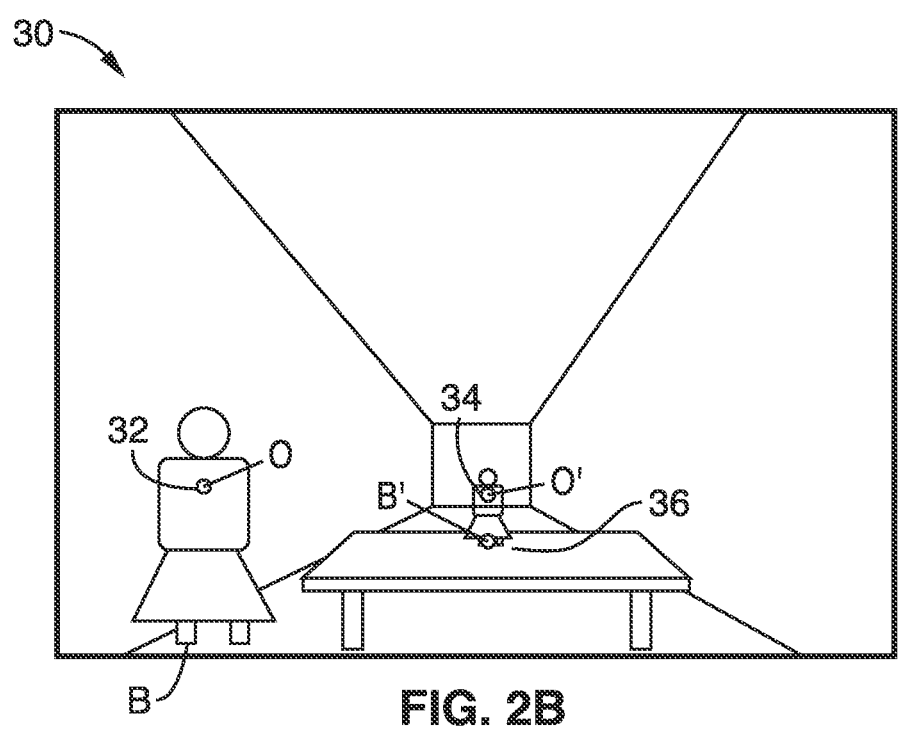

FIG. 2A illustrates a scene example 30 on the effect of proper scaling when moving an object from one location in the image to another location. In FIG. 2A one sees a person type object 32 contacting the floor in the lower part of the image, before being moved, as seen at the left, with the same person object 34 contacting the floor farther back in the room after it is moved and scaled. In this figure, the depth values of the background image at points O' and B' are approximately equal, hence using depth at O' for scaling has not created a problem. FIG. 2B illustrates a scene example 30 on the effect of improper scaling when moving an object from one location in the image to another location. In FIG. 2B, person object 34 is moved so that after the move, when scaled according to depth at point O', the bottom is in a nearer depth area on/over a table 36. This shows that using the depth at O' to perform scaling makes the person object to appear the size of a doll. This is because the scaling is done based on the depth value at point O' rather than B'. This indicates that the depth of the image at point B' should have been used for scaling the object, and not that of O'.

To resolve this issue, the present disclosure selects a depth value from the bottom point of the object, after scaling, for object scaling in the background image. Referring to FIG. 2A and FIG. 2B, this lowest point of the person object 34 is the point B'.

However, an issue arises as scaling depends on the new depth value, and the new depth value depends on the location of point B', which depends on the scaling factor. So scaling factor depends on the new depth, and the new depth depends on the scaling factor, and the question arises as to how one should determine both the new depth, and scaling factor, which are interdependent.

The determination of scale of an object at its new position in the scene is automated according to the present disclosure by not just leaving the object "hanging in the air," nor scaling the object in a manner whereby it ends up scaled disproportionally at its final position. If one assumes that the object should "land" on an underlying object/background, then the method is configured to find the "landing" point on the surface and adjust the scale of the object accordingly.

Normally, it is assumed that the bottom portion of the object should be landed. Then, if the touch point is located at the bottom of the object mask, the exact scale of the object at its new position can be found from the scaling factor: s=(original depth at the original position)/(new depth at the moved position).

The mask of the object is then recalculated to the new mask. The mask will be contracted if s<1, or expanded if s>1. In at least one embodiment, the contraction/expansion is conducted about the touch point, although other points could be utilized without departing from the teachings of the presented technology. The image of the object is thus rescaled according to the new mask. The method described herein is one for finding both the scaling factor and the new depth (hence point B'), despite their interdependence on one another.

Figure 3:
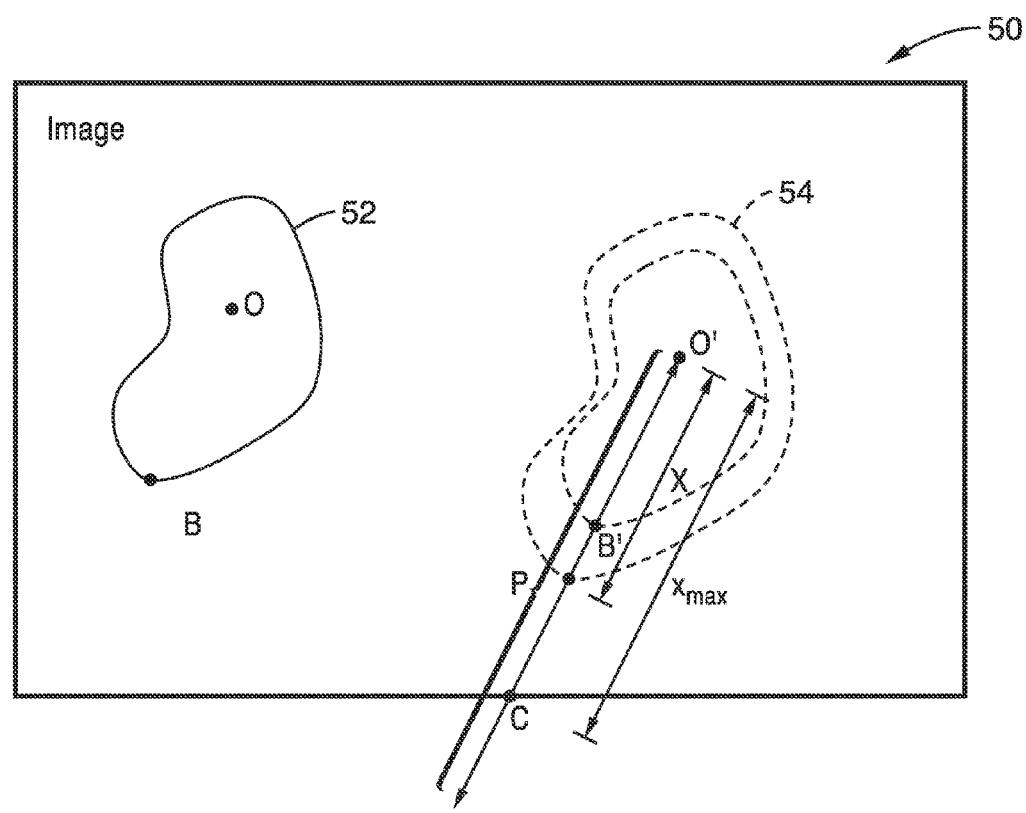
FIG. 3 is a block diagram of scaling an object at a target location according to an embodiment of the presented technology.

FIG. 3 illustrates an example image 50 showing scaling of object 52 having the touch point O and the lowest point B, into object 54 having the touch point O' and the lowest point B'. It is assumed in this example that the user wants to move the object 52 and has selected (e.g., selected in response to user finger contact on a touch screen) point O on the object in the image. It is also assumed that the user has similarly selected point O' as the target point of movement for object 52. It should be appreciated that although this example depicts moving an object in the same image, the present disclosure is also applicable to cases of copying/cutting an object from one image to another image.

At point O' for new position 54, a boundary of the moved object can be drawn assuming unity scaling (scaling of 1). The lowest point of object 52 is considered to be point B, while the lowest point of the boundary of the moved object, with a scaling factor of 1, is referred to as point B'. The depth map value of B can be denoted as $D_B$. A line is drawn from O' to B' and further extended beyond the image. The intersection of this line and the lower boundary of the image is point C.

For any point 'P' along the line connecting the points O' and C, let us denote the distance in the image between P and O' by x. Also, let us denote the distance between O' and C by $x_{max}$, and denote the distance, in the image, between O' and B' by b.

For any point P, two different depths can be computed: (a) the depth obtained from the depth map, $D_1(x)$, and (b) the depth that can be computed assuming that the object is scaled by a factor $s(P)=x/b$, wherein this computed depth is $D_c(x)=D_B/s(P)=D_B b/x$. It will be recognized that $D_1(x)$ and $D_c(x)$ are two functions in terms of x. For the purposes of scaling, these two values should be equal. The value of x, and hence P, is obtained by setting $D_1(x)=D_c(x)$, and solving the resulting equation for x, which results in the following setting which is solved for x:

$$D_1(x)=D_B b/x \qquad (1)$$

Since $D_1(x)$ is obtained from empirical data, x is determined numerically rather than analytically, and this determination corresponds to finding the intersection(s) of the two curves $D_1(x)$ and $D_c(x)$. Eq. 1 may provide one solution, more than one solution, or no solutions at all. Each solution of Eq. 1, yields an x value, which yields a position for the bottom of the moved object after scaling.

Knowing the value of x, the method can determine the scaling factor s=x/b. From x the present method can also find the depth of the bottom point after scaling as $D_B b/x$.

Figure 4A:
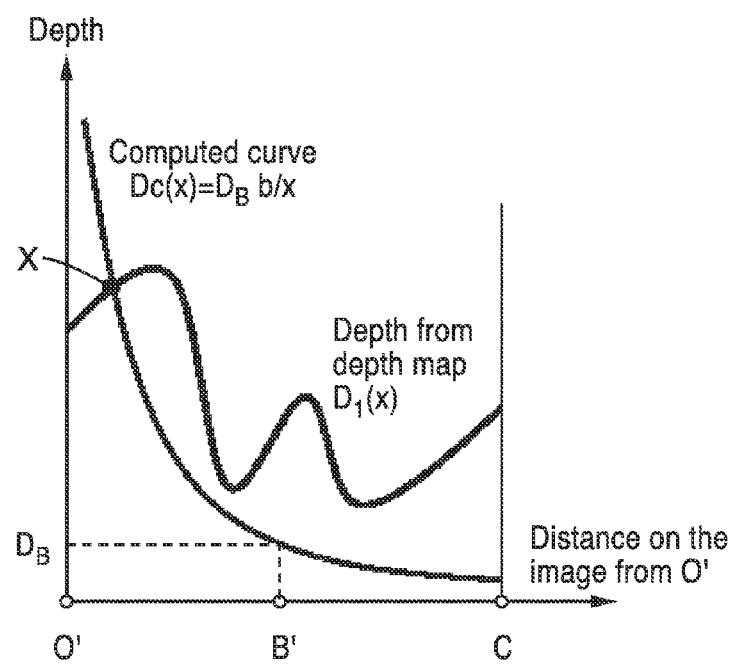
FIG. 4A through FIG. 4C are plots of different scaling solution cases according to an embodiment of the presented technology.
Figure 4B:
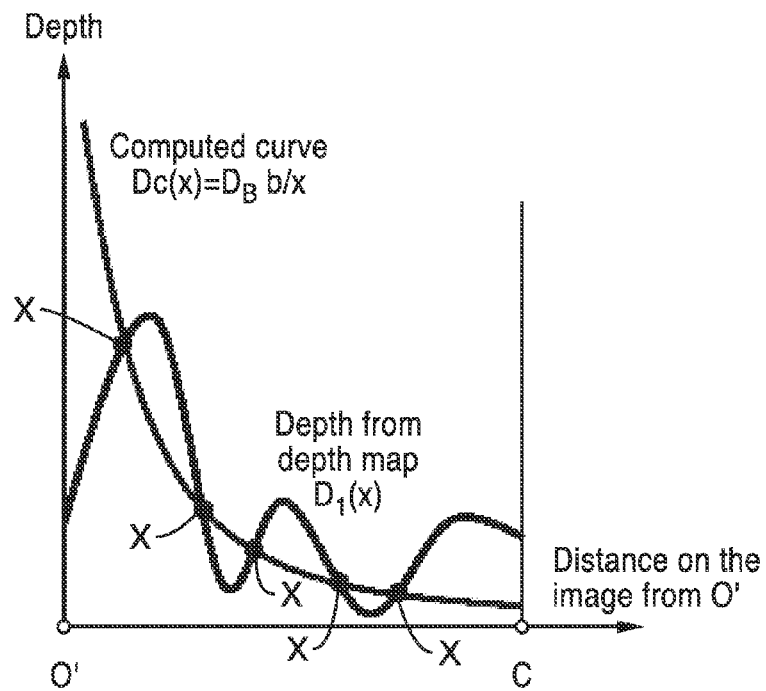
Figure 4C:
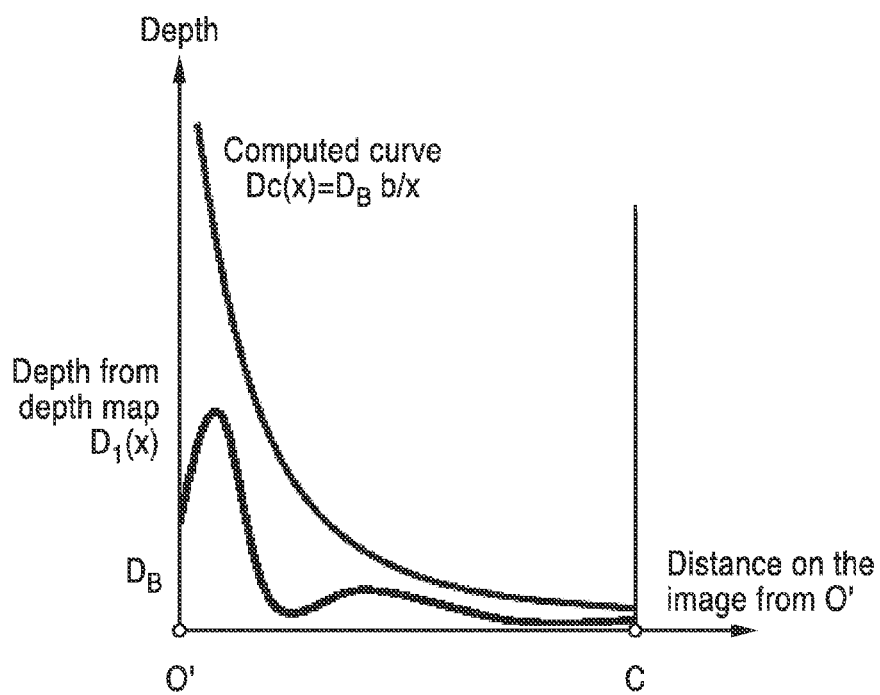

FIG. 4A through FIG. 4C depict example plots for different solution cases. In the single solution case, one solution is found in which x is uniquely found from the intersection of the two curves. In FIG. 4A, computed curve $D_c(x)=D_B b/x$, and depth from depth map as $D_1(x)$ are seen intersecting at a solution for x.

In the case in which there is more than one solution, as seen in FIG. 4B, any of the found x values are valid, and each yields a proper scaling factor. However, if object movement is performed in real-time, and in a continuum of steps, then among the valid values of x, it is best to choose the one that is closest to the x value of the previous step.

In the case where there is no solution for x, as seen in FIG. 4C, this means that the bottom of the moved object after scaling falls outside of the image. For example, this means that the bottom of the moved object is on the line passing through O' and C, but farther away from O' than C is located. It indicates that the object should be magnified to an extent to which the bottom of the object falls outside of the image, and hence the bottom will not be visible.

In such a case, the present method is configured for assigning x any value larger than $x_{max}$. However, it is generally preferable not to choose x to be excessively larger than $x_{max}$, as such a choice yields very large scaling factors. Even in cases where one or more solutions exist, the disclosed method can select to assign to x a value larger than $x_{max}$ similar to the no-solution case. However, it seems that such assignments are undesirable as they lead to excessively high scaling factors, and hence large objects.

Figure 5:
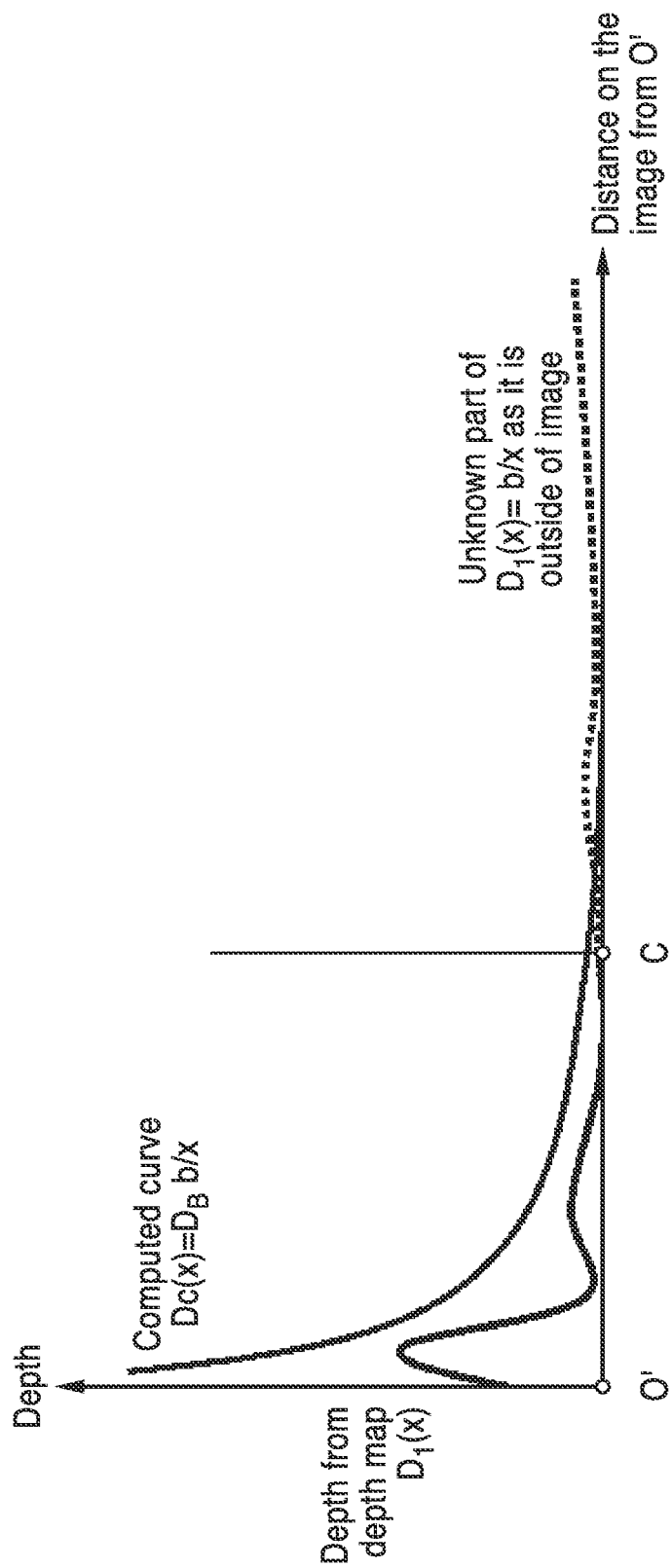
FIG. 5 is a plot of solving for scaling outside of the image boundary according to an embodiment of the presented technology.

FIG. 5 is a plot showing a case where the solution is outside of $x=x_{max}$. The dashed line indicates where depth is beyond image limit C. Therefore, with the exception of no-solution cases, it is preferable not to assign x to values larger than $x_{max}$.

In at least one preferred embodiment, the user can be given choices on how they want this object rendered, such as the extent to which x exceeds $x_{max}$ in providing a properly scaled reference.

After finding the proper x (and the scaling factor s) for the object, and depth at the bottom point of the moved object, the method finds the depth value for all other points on the moved object, and changes the depth values of the object pixels.

This is done by adding: $\Delta d=D_B b/x-D_B$ to all the measured depth values for all the pixels on the original object before the move. For the bottom point, this will yield $D_B+D_B b/x-D_B=D_B b/x$.

The disclosed method also handles the case of occlusions which arise at a depth less than the object being moved/copied. After computing the depth values for all the pixels on the moved object, for any given pixel on the moved object, a new depth value is provided. While for any point on the image which is to be overlaid by the moved object, there is also a depth from the depth map.

If for any pixel, the depth value of the overlaid pixel is smaller than the new depth value of the moved object, then the method shows the object as occluded at that point, and hence the pixel should not be copied to the image.

Figure 6:
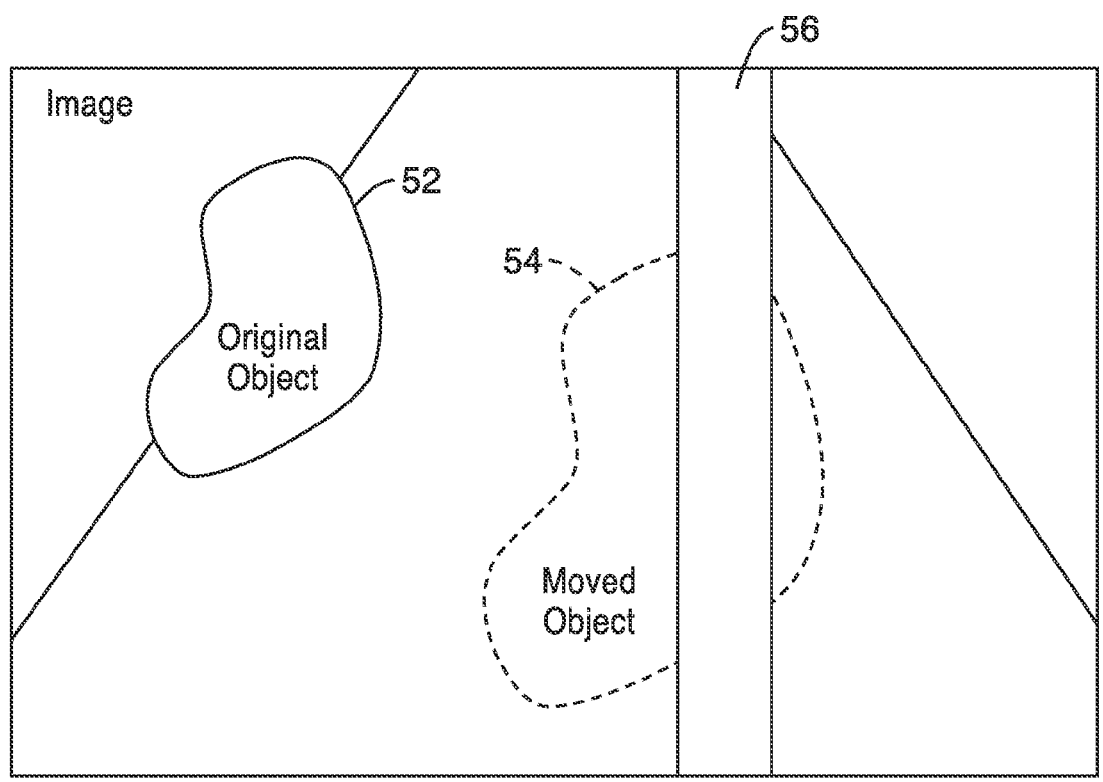
FIG. 6 is a block diagram of moving/copying an object to a target location subject to occlusion according to an embodiment of the presented technology.

FIG. 6 is an example of object occlusion. Original object 52 is to be moved to a new position as object 54. In this example, moving to the new position includes scaling; yet occlusions are handled by the technology presented regardless of the amount of scaling. Considering FIG. 6, an object 56 (bar) has lower depth values than what would arise at the object being moved, whereby the object is occluded and portions of the object are not rendered in the area of the occlusion.

Figure 7:
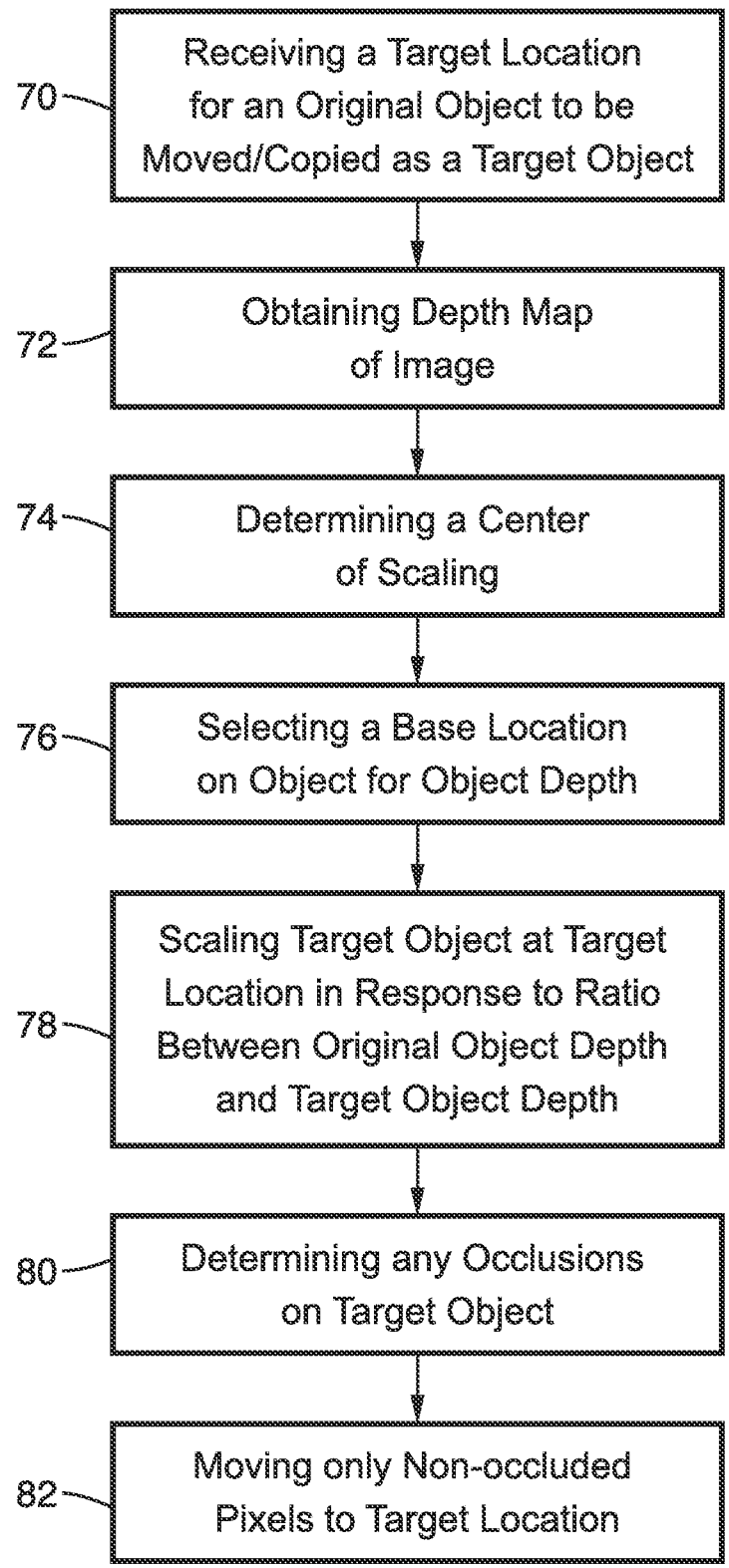
FIG. 7 is a flow diagram of the process for scaling an object being moved/copied to a target image location according to an embodiment of the presented technology.

FIG. 7 illustrates an embodiment of the presented technology for automatic scaling of objects based on depth map. An original object is selected along with a target location 70 for the object to be moved or copied to as a target object. A depth map is obtained 72, either for a single image if original object and target object location are in the same image frame, or for two images if they differ. Steps 74 through 78 provide for resolving interdependent scaling factor and positioning for the target object, as it will be appreciated that positioning impacts scaling, and vice-versa as scaling impacts positioning. A center of scaling is determined 74 for the object. A base location is selected 76 upon which to assess object depth, such as the bottom of the object assuming it is to be considered resting on an object surface, such as the floor. The target object is scaled 78 in response to a ratio between the original object depth and target object depth at the bottom point determined using the approach explained in this disclosure, and taking into account if the object extends from the image. A determination is made 80 if the target object is occluded by any other objects at the target location, whereby only non-occluded pixels of the scaled target object are moved/copied 82 to the target location.

It should be appreciated that the technology presented herein can be utilized in a variety of applications, such as whenever image processing is performed for moving image objects from one location on the image to another location on that image or another image. The steps outlined for this process are preferably executed on an electronic device having a computer processor (e.g., CPU, microprocessor, microcontroller, computer enabled ASIC, etc.) and memory (e.g., RAM, DRAM, NVRAM, FLASH, computer readable media, etc.) configured for processing a captured image. The disclosed apparatus and method can be readily implemented on cameras, mobile phones, as well as other electronic devices configured with a processor adapted for receiving images and depth information on an image (e.g., computer systems, laptops, tablet computers, palmtops). It should be appreciated that the simple techniques presented herein are particularly well-suited even for electronic devices with limited processing resources, such as on mobile phones. The computer and memory devices were not depicted in the diagrams for the sake of simplicity of illustration, as one of ordinary skill in the art recognizes the use of computer devices for carrying out steps involved with image/video encoding and decoding. The presented technology is non-limiting with regard to memory and computer-readable media, insofar as these are non-transitory, and thus not constituting a transitory electronic signal.

Embodiments of the presented technology may be described with reference to flowchart illustrations of methods and systems according to embodiments of the disclosed technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for automatically scaling image objects being moved or copied from an original object to a target object, comprising: (a) a computer processor configured for receiving and processing images; and (b) programming executable on the computer processor for performing steps comprising: (b)(i) receiving an original object selection in an image and a target location for the original object to be moved/copied as a target object at said target location; (b)(ii) obtaining or receiving a depth map for the image containing the original object and the target object location; and (b)(iii) determining interdependent scaling factor and positioning for the target object, in response to: (b)(iii)(A) determining a center of scaling for the target object; (b)(iii)(B) selecting a base location on the original object at which depth value is to be obtained at the target location for use in scaling; and (b)(iii)(C) scaling target object at target location about the center of scaling in response to a ratio between original object depth and target object depth and pasting pixels of said target object into said target location; (iv) whereby the target object is shown in a proper size in relation to its surroundings.

2. The apparatus of any preceding embodiment, wherein programming executable on the computer processor further comprises determining any occlusions on target object at target location and moving only non-occluded pixels of target object to target location.

3. The apparatus of any preceding embodiment, wherein programming executable on the computer processor further comprises receiving an original object selection and a target location in response to a user performing selection of original object and target location through a touch screen interface.

4. The apparatus of any preceding embodiment, wherein said programming executable on the computer processor further comprises generating an object mask specifying each pixel belonging to the original object.

5. The apparatus of any preceding embodiment, wherein said depth comprises distance between a lens plane of an image capture device utilized to capture said original image and points in a scene being captured as pixels.

6. The apparatus of any preceding embodiment, wherein said depth map contains a depth value for image pixels.

7. The apparatus of any preceding embodiment, wherein said programming executable on the computer processor further comprises tying said target object location to its background at a depth associated with that location thus assuming said target object rests upon another object at said target object location.

8. The apparatus of any preceding embodiment, wherein said center of scaling comprises a point in said target object about which expansion or shrinking is performed when scaling said original object to said target object.

9. The apparatus of any preceding embodiment, wherein programming executable on the computer processor further comprises selecting a base location on the original object in response to determining a bottom of the original object.

10. The apparatus of any preceding embodiment, wherein programming executable on the computer processor is configured for scaling target object at target location, by determining two different depth values for any point P, as depth obtained from the depth map as $D_1(x)$, and as a computed depth assuming that object is scaled by a factor $s(P)=x/b$, wherein depth is $Dc(x)=DB/s(P)=DB\ b/x$, and solving for value x as scaling factor, wherein value b is distance between object origin and its bottom.

11. The apparatus of any preceding embodiment, wherein said apparatus comprises a personal computer device, laptop, tablet computer, palmtops configured for receiving images, as well as in cameras and mobile phones configured for image capturing.

12. An apparatus for automatically scaling image objects being moved or copied from an original object to a target object, comprising: (a) a computer processor configured for receiving and processing images; and (b) programming executable on the computer processor for performing steps comprising: (b)(i) receiving an original object selection in an image and a target location for the original object to be moved/copied as a target object at said target location; (b)(ii) obtaining or receiving a depth map for the image containing the original object and the target object location; and (b)(iii) determining interdependent scaling factor and positioning for location of the target object, in response to: (b)(iii)(A) determining a center of scaling for the target object; (b)(iii)(B) selecting a base location on the original object at which depth value is to be obtained at the target location for use in scaling; and (b)(iii)(C) scaling target object at target location about center of scaling in response to a ratio between original object depth and target object depth and pasting pixels of said target object into said target location; (iv) wherein determination of interdependent scaling factor and positioning for the target object includes determining two different depth values for any point P, as depth obtained from the depth map as $D1(x)$, and as a computed depth assuming that object is scaled by a factor $s(P)=x/b$, wherein depth is $Dc(x)=DB/s(P)=DB\ b/x$, and determining value x as scaling factor, wherein value b is distance between object origin and its bottom; and (v) whereby the target object is shown in a proper size in relation to its surroundings.

13. The apparatus of any preceding embodiment, wherein programming executable on the computer processor further comprises determining any occlusions on target object at target location and moving only non-occluded pixels of target object to target location.

14. The apparatus of any preceding embodiment, wherein programming executable on the computer processor further comprises receiving an original object selection and a target location in response to a user performing selection of original object and target location through a touch screen interface.

15. The apparatus of any preceding embodiment, wherein said programming executable on the computer processor further comprises generating an object mask specifying each pixel belonging to the original object.

16. The apparatus of any preceding embodiment, wherein said depth comprises distance between a lens plane of an image capture device utilized to capture said original image and points in the scene being captured as pixels.

17. The apparatus of any preceding embodiment, wherein said depth map contains a depth value for image pixels.

18. The apparatus of any preceding embodiment, wherein said programming executable on the computer processor further comprises tying said target object location to its background at depth associated with that location thus assuming said target object rests upon another object at said target object location.

19. The apparatus of any preceding embodiment, wherein programming executable on the computer processor further comprises selecting a base location on the original object in response to determining the bottom of the original object.

20. A method of automatically scaling image objects being moved or copied from an original object to a target object, comprising: (a) receiving an original object selection in an image and a target location for the original object to be moved/copied as a target object at said target location within an image processing device having a computer processor and programming executable on the computer processor; (b) obtaining or receiving a depth map for the image containing the original object and the target object location; and (c) determining interdependent scaling factor and positioning for the target object, in response to: (c)(i) determining a center of scaling for the target object; (c)(ii) selecting a base location on the original object at which depth value is to be obtained at the target location for use in scaling; and (c)(iii) scaling target object at target location about the center of scaling in response to a ratio between original object depth and target object depth and pasting pixels of said target object into said target location; (d) whereby the target object is shown in a proper size in relation to its surroundings.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for automatically scaling image objects being moved or copied from an original object to a target object, comprising:
    (a) a computer processor configured for receiving and processing images; and
    (b) programming executable on the computer processor for performing steps comprising:

(i) receiving an original object selection in an image and a target location for the original object to be moved/copied as a target object at said target location;

(ii) obtaining or receiving a depth map for the image containing the original object and the target object location; and (iii) determining interdependent scaling factor and positioning for the target object, in response to:

(iii)(A) determining a center of scaling for the target object;

(iii)(B) selecting a base location on the original object at which depth value is to be obtained at the target location for use in scaling; and (iii)(C) scaling target object at target location about the center of scaling in response to a ratio between original object depth and target object depth and pasting pixels of said target object into said target location;

(iv) whereby the target object is shown in a proper size in relation to its surroundings.

2. The apparatus recited in claim 1, wherein programming executable on the computer processor further comprises determining any occlusions on target object at target location and moving only non-occluded pixels of target object to target location.

3. The apparatus recited in claim 1, wherein programming executable on the computer processor further comprises receiving an original object selection and a target location in response to a user performing selection of original object and target location through a touch screen interface.

4. The apparatus recited in claim 1, wherein said programming executable on the computer processor further comprises generating an object mask specifying each pixel belonging to the original object.

5. The apparatus recited in claim 1, wherein said depth comprises distance between a lens plane of an image capture device utilized to capture said original image and points in a scene being captured as pixels.

6. The apparatus recited in claim 1, wherein said depth map contains a depth value for image pixels.

7. The apparatus recited in claim 1, wherein said programming executable on the computer processor further comprises tying said target object location to its background at a depth associated with that location thus assuming said target object rests upon another object at said target object location.

8. The apparatus recited in claim 1, wherein said center of scaling comprises a point in said target object about which expansion or shrinking is performed when scaling said original object to said target object.

9. The apparatus recited in claim 1, wherein programming executable on the computer processor further comprises selecting a base location on the original object in response to determining a bottom of the original object.

10. The apparatus recited in claim 1, wherein programming executable on the computer processor is configured for scaling target object at target location, by determining two different depth values for any point P, as depth obtained from the depth map as $D_1(x)$, and as a computed depth assuming that object is scaled by a factor $s(P)=x/b$, wherein depth is $Dc(x)=DB/s(P)=DB\ b/x$, and solving for value x as scaling factor, wherein value b is distance between object origin and its bottom.

11. The apparatus recited in claim 1, wherein said apparatus comprises a personal computer device, laptop, tablet computer, palmtops configured for receiving images, as well as in cameras and mobile phones configured for image capturing.

12. An apparatus for automatically scaling image objects being moved or copied from an original object to a target object, comprising:

(a) a computer processor configured for receiving and processing images; and (b) programming executable on the computer processor for performing steps comprising:

(i) receiving an original object selection in an image and a target location for the original object to be moved/copied as a target object at said target location;

(ii) obtaining or receiving a depth map for the image containing the original object and the target object location; and (iii) determining interdependent scaling factor and positioning for location of the target object, in response to:

(iii)(A) determining a center of scaling for the target object;

(iii)(B) selecting a base location on the original object at which depth value is to be obtained at the target location for use in scaling; and (iii)(C) scaling target object at target location about center of scaling in response to a ratio between original object depth and target object depth and pasting pixels of said target object into said target location;

(iv) wherein determination of interdependent scaling factor and positioning for the target object includes determining two different depth values for any point P, as depth obtained from the depth map as $D1(x)$, and as a computed depth assuming that object is scaled by a factor $s(P)=x/b$, wherein depth is $Dc(x)=DB/s(P)=DB\ b/x$, and determining value x as scaling factor, wherein value b is distance between object origin and its bottom; and (v) whereby the target object is shown in a proper size in relation to its surroundings.

13. The apparatus recited in claim 12, wherein programming executable on the computer processor further comprises determining any occlusions on target object at target location and moving only non-occluded pixels of target object to target location.

14. The apparatus recited in claim 12, wherein programming executable on the computer processor further comprises receiving an original object selection and a target location in response to a user performing selection of original object and target location through a touch screen interface.

15. The apparatus recited in claim 12, wherein said programming executable on the computer processor further comprises generating an object mask specifying each pixel belonging to the original object.

16. The apparatus recited in claim 12, wherein said depth comprises distance between a lens plane of an image capture device utilized to capture said original image and points in the scene being captured as pixels.

17. The apparatus recited in claim 12, wherein said depth map contains a depth value for image pixels.

18. The apparatus recited in claim 12, wherein said programming executable on the computer processor further comprises tying said target object location to its background at depth associated with that location thus assuming said target object rests upon another object at said target object location.

19. The apparatus recited in claim 12, wherein programming executable on the computer processor further comprises selecting a base location on the original object in response to determining the bottom of the original object.

20. A method of automatically scaling image objects being moved or copied from an original object to a target object, comprising:

(a) receiving an original object selection in an image and a target location for the original object to be moved/copied as a target object at said target location within an image processing device having a computer processor and programming executable on the computer processor;

(b) obtaining or receiving a depth map for the image containing the original object and the target object location; and (c) determining interdependent scaling factor and positioning for the target object, in response to:

(c)(i) determining a center of scaling for the target object;

(c)(ii) selecting a base location on the original object at which depth value is to be obtained at the target location for use in scaling; and (c)(iii) scaling target object at target location about the center of scaling in response to a ratio between original object depth and target object depth and pasting pixels of said target object into said target location;

(d) whereby the target object is shown in a proper size in relation to its surroundings.

* * * * *